Patented Nov. 13, 1934

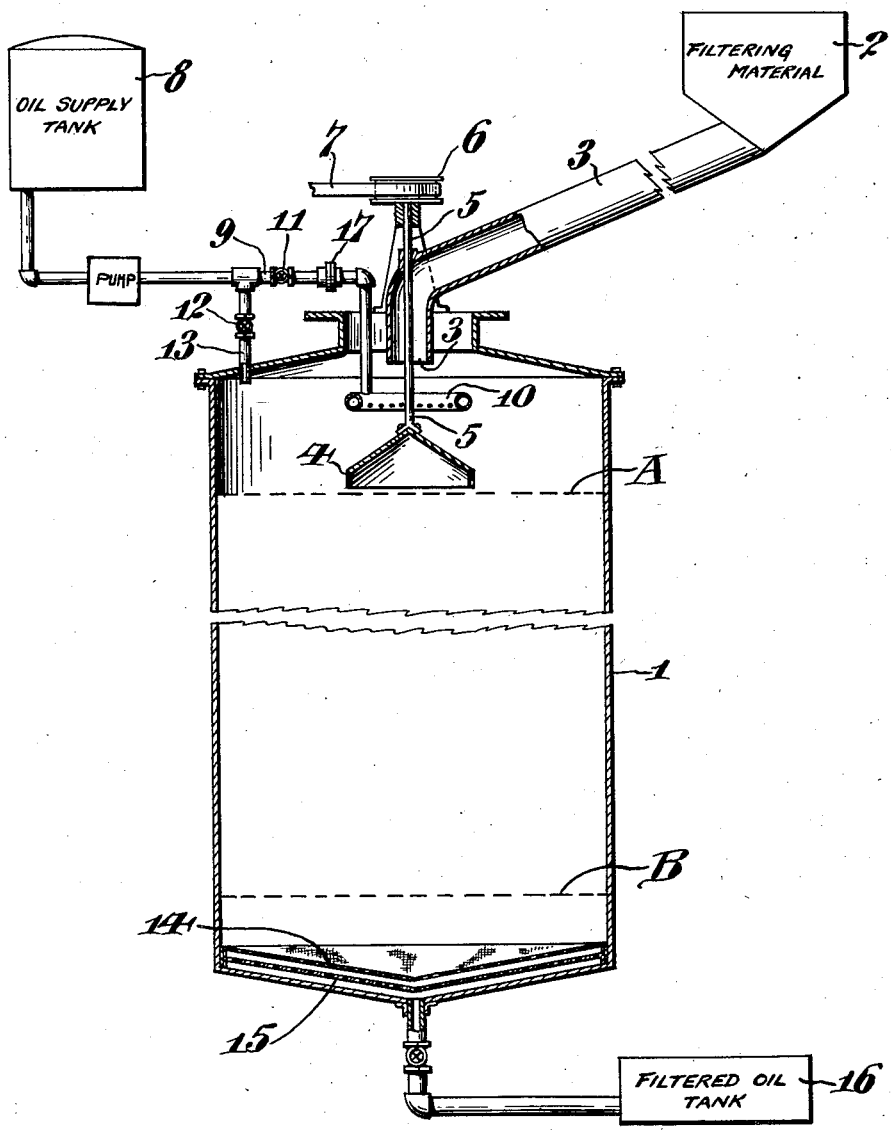

1,980,431

UNITED STATES PATENT OFFICE

1,980,431

FILTRATION

Ivan M. Perkins, Brookline, Pa., assignor to The Atlantic Refining Company, Philadelphia, Pa., a corporation of Pennsylvania Application January 31, 1931, Serial No. 512,524
Renewed February 14, 1934

11 Claims. (Cl. 210—122)

The present invention relates to improvements in the art of filtration of liquids, and more particularly to that type of filtration usually referred to as percolation filtration, which involves passage of the liquid through a bed of filtering material, such as fuller's earth, diatomaceous earth, clay, charcoal or other equivalent filtering material. This particular type of filtration is characterized in that only a small portion of the liquid capable of being efficiently filtered through a given quantity of the filtering material, is in contact with such filtering material at any given time.

My invention is particularly adapted to the treatment of hydrocarbon oils which are to be passed through a bed of filtering material of substantial thickness for one of the several purposes for which such treatment may be applied, as for example, for the removal of gum and/or color therefrom. Hereinafter, while my invention may be described with respect to this specific adaptation thereof, namely, the treatment of hydrocarbon oils, it is to be understood that the invention is of broader and more general application.

As commercially applied the percolation method for filtering a liquid involves passing a stream of the liquid into a large compartment containing a bed of considerable depth of the filtering material in amounts which may be, for example, of the order of from 5 to 50 tons. The filtering material prior to being placed in the compartment may be conditioned if necessary, as for example, in the case of fuller's earth, by subjecting it to a suitable burning operation. The liquid to be filtered is pumped or otherwise conducted to the top of the compartment containing the filtering material and is allowed to flow by gravity, or it may be induced to flow by means of pressure, through the thick bed of filtering material which at the beginning of the operation, in accordance with practice heretofore, is in a dry condition. As a result, considerable time is required for the liquid being filtered to initially wet the dry bed of filtering material, and this initial wetting step occupies considerable of the total time required to carry out the process. For example, in the case of certain viscous oils which are customarily subjected to a step of filtration in the process of being refined, when being passed through a fuller's earth filter of 17 tons capacity, may well be expected to require a period of the order of about 40 hours before the initial wetting of the filtering material is accomplished. When pressure is applied, as for example, pressures of the order of 50 lbs. more or less in excess of atmospheric, the time required for the initial wetting of the filtering material may be to a certain extent decreased. In general, however, in accordance with prior practice, the time required to wet the filtering material prior to putting the filter on stream is of the order of from one tenth to one quarter of the total time required to exhaust those qualities of the filtering material which are requisite to attaining the desired results, when the filter is actually on stream.

A primary object of the present invention is to effect a saving in time, more particularly, to cut down the time required for liquid after flow thereof into a percolation filter has been commenced, to start emerging from the filter in a continuous stream.

The present invention is based upon my discovery that the time required for an oil to emerge from or initially pass through a bed of filtering material, in particular, fuller's earth, may be materially decreased, by wetting the fuller's earth with an oil of the character of that which is to be filtered therethrough, at the time the filtering material is charged to the filtering compartment. By so preceding, the filtering material, upon forming a bed in the compartment, will have already been wetted. After charging the compartment with filtering material wetted as it is charged, the filter may be put on stream, or in other words, the oil to be filtered may be pumped or otherwise conveyed to the top of the bed of filtering material.

My invention may be more clearly understood from the following description of a preferred modification, read in the light of the accompanying drawing in which:

The figure is a diagrammatic elevational view partly in section of one type of apparatus in which my process may be carried out.

In the drawing, 1 is a conventional filter which, for example, may be of 17-ton capacity, and have a height of 12 feet and diameter of 10 feet. It will be obvious, however, that my invention in terms of apparatus is not to be considered as limited to a filter of any particular dimensions. Prior to putting the filter on stream, dry clay, such as fuller's earth or equivalent filtering material, from hopper 2 is charged thereto through conduit 3. The clay enters the top of the filter and falls upon the conical surface of spreader 4. This spreader is connected to shaft 5 rotated by any suitable means, such as pulley 6 and belt 7, thereby insuring an even distribution of the clay within the filter.

Tank 8, containing oil to be filtered, is connected through line 9 to a circular oil spray 10 which surrounds the conical spreader 4 and is adapted to spray oil upon the spreader, thereby to wet the clay as it is charged to the filter. The amount of oil required to wet the clay will vary with the amount and type of clay used and the particular oil, and in the case of a 17-ton filter may well be of the order of 3000 gallons.

When the filter is completely charged with wet clay, for example, to clay level A, introduction of clay is discontinued, valve 11 is closed and a head of oil is supplied to the filter by opening valve 12 of line 13, which is suitably connected to tank 8 through line 9. For the remainder of the cycle of operation the filter is operated in the usual manner.

The bottom of the filter is equipped with any suitable means for separating the oil from the clay, the means shown in the drawing being canvas 14 mounted above perforated support plate 15. Oil passing through the canvas is transferred to filtered oil tank 16.

In operating the filter under pressure, the charging apparatus may be withdrawn through the top of the filter and the top closed by a suitable cover. To facilitate withdrawal of oil spray 10, line 9 is provided with a union 17. Pressure may be developed by means of the pump in line 9.

To insure satisfactory color removal from the oil which first passes through the filter, it is desirable to provide a layer of dry clay in the bottom of the filter. This may be accomplished, for example, by allowing a desired amount of clay to pass into the filter before the oil spray is placed in operation. Thus, a layer of dry clay, to a level such as indicated by dotted line B, may be formed, and, for example, in a 17-ton filter, may be from 6 inches to 2 feet in thickness. It is obvious that the time required for the oil to penetrate this relatively thin layer of dry clay will be short as compared with the time necessary for oil to pass through a filter entirely filled with dry clay.

Provision of this layer of dry clay, although preferred, is not essential to my process; and in case the oil initially passing through the filter is not of the desired quality, it may simply be recycled.

The following is a further disclosure of my invention, by way of a specific example:

Dry fuller's earth was charged to a 20 ton capacity filter until a layer about one foot in depth was formed. Charging was continued with simultaneous spraying of the charge with a portion of the oil to be filtered until an additional layer of about 12 feet in depth was formed, approximately 2300 gallons of oil being used for this purpose. The oil to be treated had a gravity of 23° Bé., viscosity of 150 sec. Saybolt universal at 210° F., and a color of 4¾ dilute N. P. A.

The charging apparatus was removed from the filter and a suitable cover fastened over the inlet thereof. The filter was then put on stream and a pressure of about 10# was established upon the oil at the top of the filter. Seven and a half hours afterward an oil stream emerged from the outlet of the filter, the color of the oil having been changed to 3¾ dilute N. P. A.

In a run carried out upon the same oil under the same conditions, except that when the oil was initially put on stream, the bed of fuller's earth was in a dry condition, or had not been wetted during charging, sixty hours elapsed between the time the oil was put on stream and the time a stream of the oil emerged from the filter. The color change effected was the same as in the previous run.

Upon reviewing the results of a number of test runs under varying conditions and upon different oils, I find that in each instance without any sacrifice in quality of product produced, considerable time is saved by wetting the clay, as it is charged to the filter, rather than charging the clay in a dry condition and depending upon the oil after it has been put on stream to effect the necessary initial wetting, as has been done in practice heretofore.

The term "percolation filtration" when used herein and in the appended claims is to be understood to mean filtration in which the bed of material through which the liquid is to be filtered, is of substantial thickness or depth. When my invention is employed in the percolation filtration of oil, the bed of material may, for example, be of a thickness of the order of five feet more or less.

What I claim is:

1. In a process which involves percolating a liquid through a bed of filtering material of substantial thickness, that improvement which comprises wetting the filtering material with a liquid of the character of that to be filtered prior to the formation of the filtering material into the bed through which liquid is subsequently to be percolated, and forming the wetted filter material into a bed of substantial thickness.

2. In a percolation filtration process which includes the steps of charging previously unwetted filtering material to a filter to form a bed and subsequently filtering a liquid through the bed, that improvement which comprises wetting the filtering material with a liquid of substantially the character of that subsequently to be filtered therethrough, after the material is charged to the filter and prior to its formation into a bed.

3. A percolation filtration process which comprises wetting filtering material with a liquid of the character of that subsequently to be filtered therethrough, forming the wetted filtering material into a bed of substantial thickness, and percolating liquid through the wetted bed of filtering material.

4. A percolation filtration process which comprises wetting filtering material with a liquid of the character of that subsequently to be filtered therethrough as it is being formed into a bed of substantial thickness, and percolating liquid through said wetted bed of filtering material.

5. A percolation filtration process which comprises partially filling a filter with dry filtering material, filling the remainder of the filter with a filtering material wetted with a liquid of the character of that to be filtered therethrough, then percolating liquid through said filter.

6. In a process which involves percolating liquid through a relatively thick bed of filtering material, that improvement which comprises wetting the bulk of the filtering material prior to its formation into the bed, with a liquid of the character of that subsequently to be filtered therethrough, and disposing the wetted portion upon a relatively thin layer of unwetted filtering material, thereby to form a filter bed of substantial thickness, such layer of unwetted filtering material being sufficient to effect filtration of the liquid employed in wetting said bulk of filtering material.

7. In a process for the filtration of hydrocarbon oils which includes percolation of the oil through a bed of filtering material of substantial thickness, that improvement which comprises wetting the filtering material with an oil of substantially the character of that subsequently to be filtered therethrough and forming the wetted filtering material into a bed of substantial thickness.

8. In a process for the filtration of viscous hydrocarbon oils, which includes percolation of the oil through a bed of fuller's earth of substantial thickness, that improvement which comprises wetting the bulk of the fuller's earth with an oil of substantially the character of that subsequently to be filtered therethrough and prior to forming the wetted fuller's earth into a bed of substantial thickness, and disposing the wetted portion upon a relatively thin layer of unwetted filtering material, thereby to form a filter bed of substantial thickness, such layer of unwetted filtering material being sufficient to effect filtration of the oil employed to wet said bulk of fuller's earth.

9. In combination with a filter, means for charging a filtering medium thereinto, a spreader, means for rotating the spreader, and means located adjacent the spreader, through which liquid may be introduced to wet filtering medium while being distributed by the spreader.

10. Percolation filtration apparatus which comprises a compartment having a liquid inlet and outlet adjacent its upper and lower ends respectively, means for charging a filtering material into the compartment adjacent its upper end, a spreader located adjacent the outlet of the charging means, means for rotating the spreader, and means located in proximity of the spreader whereby filtering material while being spread thereby may be wetted with liquid.

11. In the process of building up a percolation filtration bed for hydrocarbon oils which will provide for rapid initial passage of the oil therethrough after the bed is built up, the step which comprises charging a filtering material to the filter in a state of substantially uniform dissemination, and wetting said material with an oil of substantially the character of that subsequently to be filtered therethrough while it is disseminated and forming the netted filtering material into a bed of substantial thickness.

IVAN M. PERKINS.